Jan. 9, 1951  S. E. WARREN, SR  2,537,724
EVAPORATED MILK CAN OPENER
Filed Dec. 20, 1946
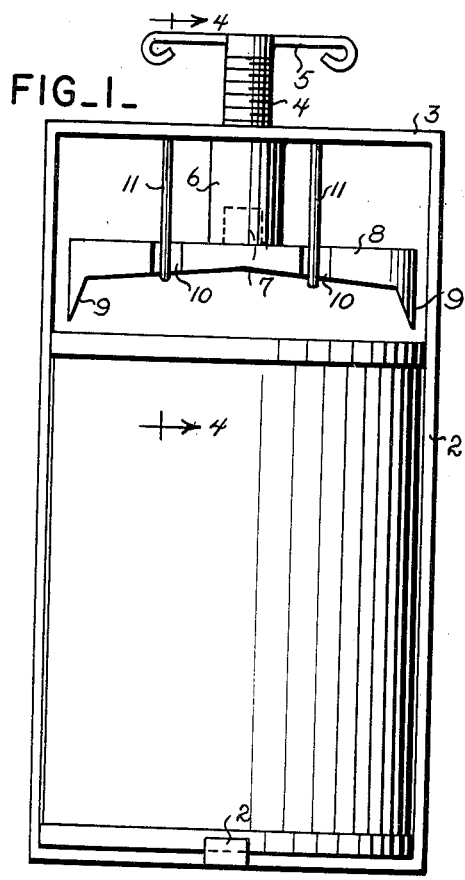
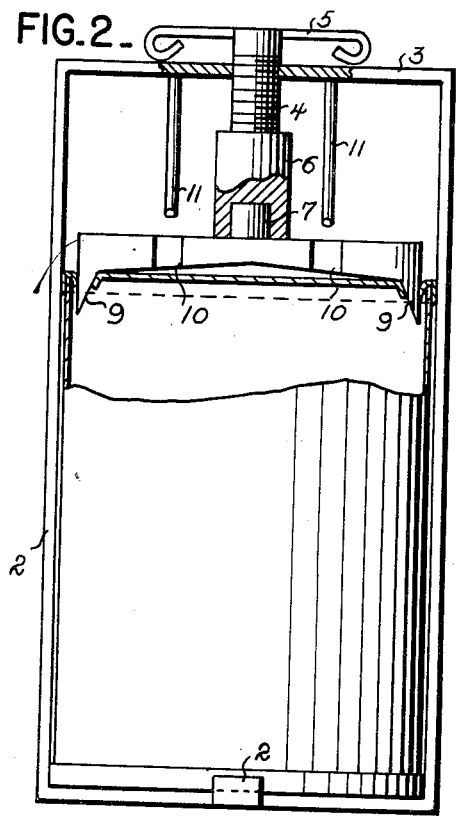
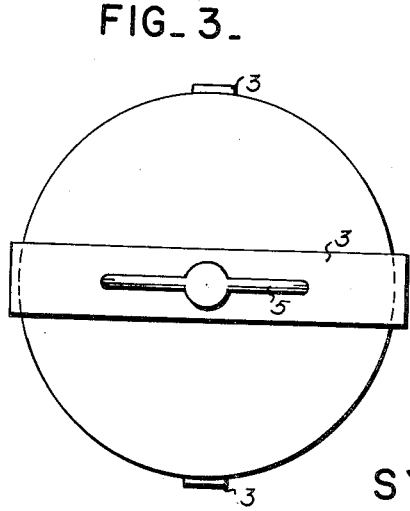
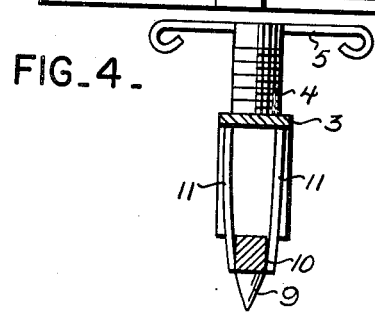
*INVENTOR.*
SYLVANUS E. WARREN, SR
BY *Victor J. Evans & Co.*
ATTORNEYS Patented Jan. 9, 1951

2,537,724

UNITED STATES PATENT OFFICE 2,537,724

EVAPORATED MILK CAN OPENER

Sylvanus E. Warren, Sr., Scranton, Pa.

Application December 20, 1946, Serial No. 717,574

2 Claims. (Cl. 220—51)

This invention relates to can opening devices, and more particularly to improvements in devices for opening and sealing cans such as used for evaporated milk, fruit juices, and the like.

It is a common practice to punch holes in the cover of an evaporated milk can or fruit juice can, usually two holes being punched, to enable easy flow of the contents. The milk is allowed to remain in the can, and is exposed to the air, dust and odors by the holes in the top, which results in souring and contamination of the milk or other contents.

It is, therefore, an object of this invention to provide a device for quickly and conveniently punching two holes in the top of a can and to maintain such holes covered when the can is not in use.

A further object is to provide a simple and sanitary device for punching and covering holes in a milk can, which device is easy to manipulate, easily cleaned, and inexpensively manufactured.

These and other objects are attained by the novel construction and arrangement of parts hereinafter described and illustrated by the accompanying drawings, forming a part hereof, and in which:

Fig. 1 is an elevational view of a device embodying the invention in a raised position above a can.

Fig. 2 is an elevational view of the device in a position puncturing a can.

Fig. 3 is a plan view of the device.

Fig. 4 is an end view of the device.

Referring to the drawings, the can puncturing device is shown to comprise a rectangular frame 1 having at the bottom thereof transverse arms upon which a can can rest, the arms being indicated by the numeral 2. The upper cross member 3 of the frame is provided with a threaded aperture through which passes a threaded stem 4, having a handle 5 at its upper end and a boss 6 at the lower end having a recess receiving a plug 7 integral with a bar 8, which has puncturing prongs 9 at each end thereof.

The bar 8 is provided with pairs of grooves 10 adapted to frictionally engage spring arms 11 depending from the cross member 3.

In operation, the bar 8 is placed between the spring arms 11, and the stem 4 screwed down to place the boss 6 over the plug 7. Continued screwing down of the stem will force the prongs 9 into the top of a milk can or like, puncturing the top to provide two diametrically opposite holes in the top. The bar 8 can now be removed and the milk poured through either of the holes. When the milk has been poured and the can is to be set aside with milk therein for future use, the prongs 9 are inserted into the holes to provide tight closures, to prevent air and dirt from getting to the contents of the can.

The device is simple and can be readily applied to punch holes in any kind of cans. It is easy to manipulate, positive in operation, and inexpensive to manufacture.

The above description is to be considered as illustrative and not limitative of the invention, of which modifications can be made without departing from the spirit and scope as set forth in the appended claims.

The invention having been described, what is claimed is:

1. In a device for puncturing holes in cans, a can-receiving frame having a cross member formed with a threaded hole positioned centrally thereof, a plurality of spring arms depending from said cross member, a threaded stem passing through said hole in said cross member, a handle for rotating said threaded stem secured to said stem, a depending boss formed on the lower end of said stem, said boss being formed with a recess therein, and a cross bar having a plug formed centrally thereof adapted to be rotatably secured in said recess in said cross member, said cross bar being provided with can puncturing prongs at the ends thereof, and with apertures through which said spring arms may extend when said cross bar is screwed down until the prongs on said bar rest against the top of a can held in said device upon rotation of said handle.

2. In a device for puncturing holes in cans, a frame adapted to hold a can and having a cross member formed with a threaded hole positioned centrally thereof, a screw threaded stem passing through said hole, a handle for rotating said stem secured to the upper end thereof, a depending boss formed on said stem at the lower end thereof, said boss being provided with a recess in the lower part thereof, a plurality of depending spring arms secured to said cross bar and extending within said frame, and a cross bar having a plug adapted to be rotatably mounted in said recess in said boss, said cross bar being formed with can-puncturing prongs at the ends thereof, and with apertures through which said spring arms extend when said cross bar is screwed down until the puncturing prongs on said cross bar rest against the top of a can held in said frame when said handle is rotated, thereby causing rotation downwardly of said screw-threaded stem, said spring arms being adapted to have their lower ends abut the cross bar to hold the cross bar in a raised position with relation to the frame.

SYLVANUS E. WARREN, SR.

REFERENCES CITED

The following references are of record in the file of this patent:

UNITED STATES PATENTS

| Number | Name | Date |
| --- | --- | --- |
| 332,788 | Couch | Dec. 22, 1885 |
| 1,509,867 | Gordy | Sept. 30, 1924 |
| 1,862,783 | Burvenick | June 14, 1932 |
| 1,887,592 | Goodfellow | Nov. 15, 1932 |
| 1,888,411 | Schilling | Nov. 22, 1932 |
| 2,344,343 | Donner | Mar. 14, 1944 |